Jan. 5, 1960  E. V. SUNDT  2,919,598
DRIVING MECHANISM FOR WINDSHIELD WIPERS AND THE LIKE
Filed April 19, 1956  2 Sheets-Sheet 1
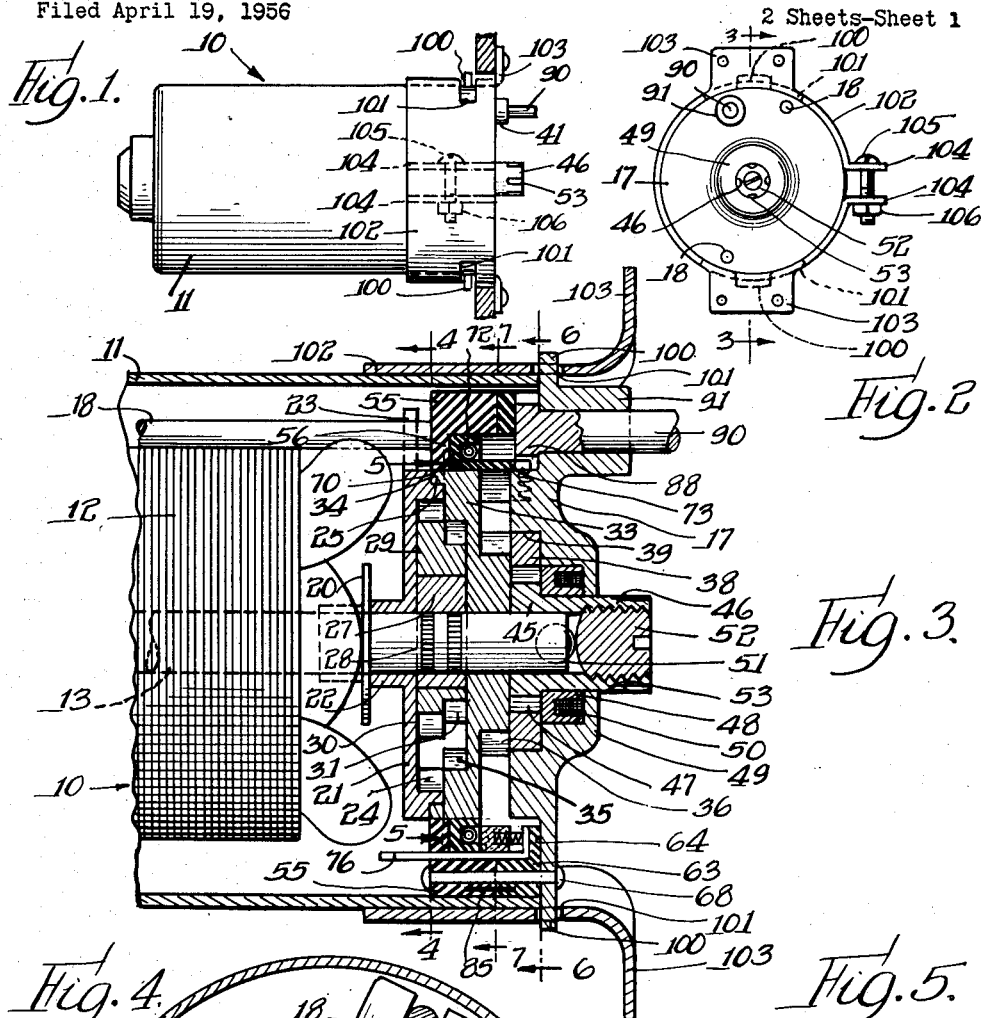
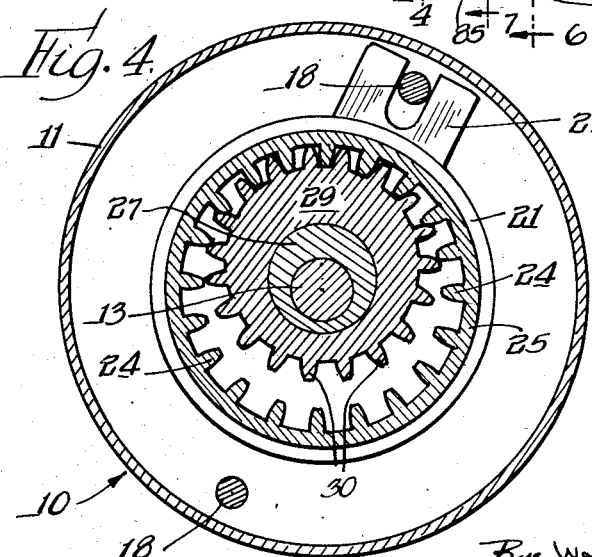
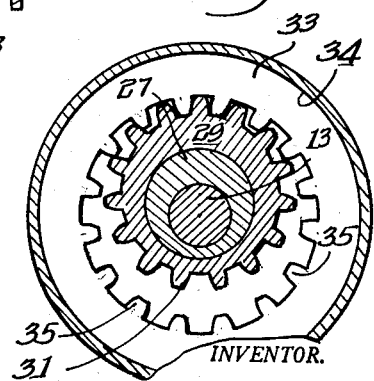
INVENTOR.
Edward V. Sundt
By Wallenstein + Spangenberg
attys.

Jan. 5, 1960
E. V. SUNDT
2,919,598
DRIVING MECHANISM FOR WINDSHIELD WIPERS AND THE LIKE
Filed April 19, 1956
2 Sheets-Sheet 2
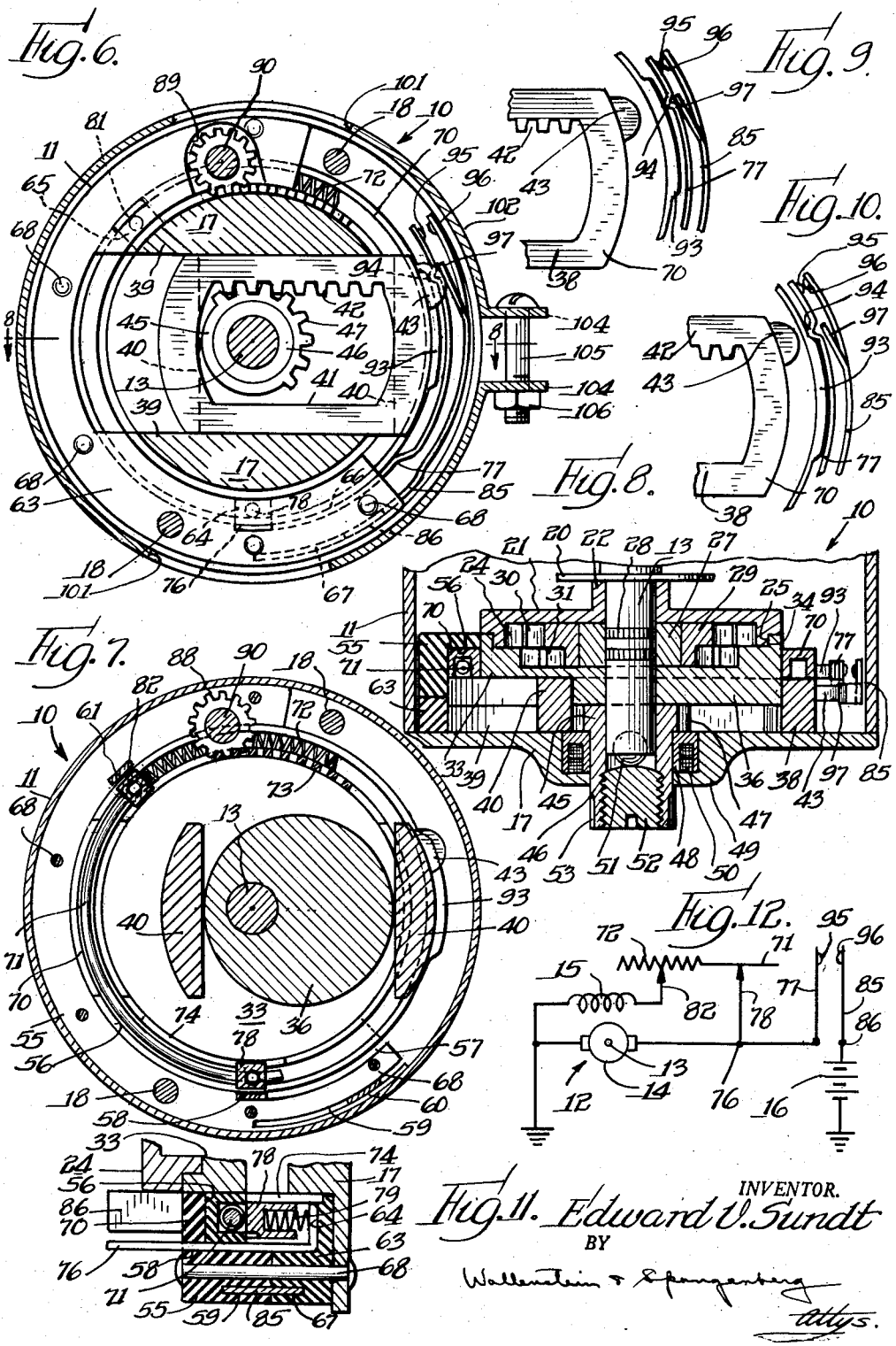
INVENTOR.
Edward V. Sundt
BY
Wallenstein & Spangenberg
attys.

United States Patent Office 2,919,598
Patented Jan. 5, 1960

2,919,598
DRIVING MECHANISM FOR WINDSHIELD WIPERS AND THE LIKE

Edward V. Sundt, Wilmette, Ill.

Application April 19, 1956, Serial No. 579,236

9 Claims. (Cl. 74—472)

This invention is directed to a driving mechanism for windshield wipers and the like and this application is a continuation in part of my co-pending application Serial No. 547,130, filed November 16, 1955.

The principal object of this invention is to provide an improved driving mechanism for windshield wipers and the like which is simple in construction, foolproof in operation and inexpensive to manufacture and assemble, wherein the parts of the driving mechanism are symmetrically arranged about a central motor shaft axis, wherein the driving mechanism including its substantially cylindrical housing may be mounted on a bracket for adjustment about its central motor shaft axis for adjustably shifting the oscillating range of the windshield wipers and the like, wherein the speed of operation may be controlled by a variable resistance means associated with the motor, and wherein operation is always stopped with the wiper in an end position of its stroke.

Briefly, the driving mechanism of this invention for windshield wipers and the like includes an electric motor, a shaft rotated thereby, an eccentric secured to the shaft for rotation therewith and a member rotatably mounted on the eccentric and oscillated thereby. This member has a pair of rings of gear teeth arranged thereon. A first toothed gear is arranged concentric with the shaft and is secured against rotation and it meshes with one ring of gear teeth on the member to react against the member. A second toothed gear is rotatably mounted concentrically with the shaft and meshes with the other ring of gear teeth on the member for rotation by the member. A second eccentric is carried by the second toothed gear and a slider is reciprocated by the rotation of this second eccentric. The slider is provided with a rack which meshes with a pinion which, in turn, is rotatably mounted concentrically with the shaft and is oscillated by the rack through a fixed angle of oscillation and forms oscillating driving means for the windshield wipers and the like. More broadly stated, the driving mechanism of this invention includes a differential gear speed reducer means concentric with the motor shaft and having an output member rotated at reduced speed thereby, and motion transmitting means concentric with the shaft and connected to the output member of the speed reducer means, and including means for translating rotary motion of the speed reducer means to oscillatory motion through a fixed angle of oscillation and forming oscillating driving means for the windshield wipers and the like. There is thus provided an extremely simple drive mechanism which is fool-proof in operation and inexpensive to manufacture and assemble. The parts of the drive mechanism are symmetrically arranged about the central motor shaft to provide direct and straightforward operation and which permits adjustment about the central axis for adjustably shifting the oscillating range of the windshield wipers and the like driven thereby. This shifting of the oscillating range is readily accomplished, without adjusting the internal parts, merely by adjustably mounting the driving mechanism in a suitable mounting bracket.

Electrical means for starting and stopping the electric motor are also provided, and they include normally closed switch means for maintaining the electric motor in operation, and means on the slider engaging the switch means for opening the same when the slider reaches an end position, for continuing motor operation until the oscillating driving means is oscillated to one end of the fixed angle of oscillation and then stopping the motor. Manually operated means are also provided for shifting the switch means out of the path of the movement of the slider, for continuously maintaining the switch means closed to maintain the motor in continuous operation for as long as desired. When the manually operated means is manipulated to stop operation of the motor, the motor, however, continues in operation until such time as the wiper or the like has been moved to an end position in its stroke. Variable resistance means are also provided for controlling the speed of operation of the motor and this variable resistance means is also controlled by the manually operated means which starts and stops the motor.

Other objects of this invention reside in the details of construction of the driving mechanism and in the cooperative relationships between the component parts thereof.

Further objects and advantages of this invention will become apparent to those skilled in the art upon reference to the accompanying specification, claims and drawings, in which:

Fig. 1 is a side elevational view of the driving mechanism of this invention.

Fig. 2 is an end elevational view of the driving mechanism looking from the right of Fig. 1.

Fig. 3 is an enlarged vertical sectional view taken substantially along the line 3—3 of Fig. 2.

Fig. 4 is a vertical sectional view taken substantially along the line 4—4 of Fig. 3.

Fig. 5 is a vertical sectional view taken substantially along the line 5—5 of Fig. 3.

Fig. 6 is a vertical sectional view taken substantially along the line 6—6 of Fig. 3.

Fig. 7 is a vertical sectional view taken substantially along the line 7—7 of Fig. 3.

Fig. 8 is a horizontal sectional view taken substantially along the line 8—8 of Fig. 6.

Fig. 9 and Fig. 10 are partial views of a portion of the mechanism illustrated in Fig. 6 showing different operating positions of the parts for controlling the switch means.

Fig. 11 is an enlarged detail view of the mechanism shown in the lower portion of Fig. 3.

Fig. 12 is a wiring diagram showing the manner of starting and stopping and controlling the speed of the operation of the electric motor.

The driving mechanism of this invention for driving windshield wipers and the like is generally designated at 10 and it includes an electric motor having a substantially cylindrical housing 11 and a motor structure 12 located therein, for rotating a motor shaft 13. The electric motor is of conventional construction and is driven by the electrical system of the automotive vehicle. In Fig. 12 the electric motor is shown to be a shunt type D.C. motor having a wound armature 14 driving the shaft 13 and a shunt field 15, current being supplied to the electric motor by a storage battery 16 which may be of the 12 volt type. The motor is of such construction that it will have a controllable speed and good torque characteristics over a range of substantially 1500 to 6,000 r.p.m. The housing 11 is provided with an end plate 17, and the entire construction is held in assembled relation by assembly screws 18.

Suitably secured to the motor shaft 13 adjacent the motor structure 12, is a flanged collar 20, which may be formed from nylon or the like. Adjacent the collar 20 is a gear member 21 having a hub 22 for rotatably mounting the same on the motor shaft 13. This gear member 21 is provided with a bifurcated extension 23, which receives one of the assembly screws 18 for securing the gear member 21 against rotation. The gear member 21 is provided with internal gear teeth 24 and preferably the gear member 21 is formed of powdered iron or the like. The gear member 21 is also provided with an annular shoulder 25.

An eccentric 27, formed of powdered iron or the like, is secured to the shaft 13 as by a pressed fit, and the shaft 13 may be provided with suitable serrations 28 to assist in securing the eccentric thereto. Rotatably mounted on the eccentric 27 is a member 29 which is preferably formed from nylon, Teflon or the like. This member 29 is provided with a first ring 30 of gear teeth which meshes with the internal gear teeth 24 of the gear member 21. The member 29 is also provided with a second ring 31 of gear teeth. A second gear member 33 is rotatably mounted on the shaft 13 and it is provided with a shoulder 34 running against the shoulder 25 on the gear member 21, and this second gear member 33 is provided with internal teeth 35 which mesh with the teeth 31 on the member 29. This gear member 33, which is the output member of the differential gear reducer, has an eccentric 36 formed thereon, the gear member and eccentric being preferably formed from powdered iron or the like. The powdered iron gear members 21 and 33, and the powdered iron eccentric 27, are preferably impregnated with a suitable lubricant to assure proper lubrication of these parts.

For purposes of illustration in this application, the number of teeth 24 on the gear member 21 is 20 teeth, the number of teeth 30 on the member 29 is 19 teeth, the number of teeth 31 on the member 29 is 15 teeth, and the number of teeth 35 on the gear member 33 is 16 teeth. Assuming that the motor is operating at maximum speed for rotating the shaft at 6,000 r.p.m., since the gear 24, having 20 teeth, has one tooth more than the ring 30 of gear teeth, which has 19 teeth, there is a one-tooth difference which causes the member 29 to turn on its axis at the rate of $$\frac{6,000}{20}=300 \text{ r.p.m.}$$

in the countershaftwise direction. This rotation of the member 29 is imparted to the gear 33 through the meshing gear teeth 31 and 35. Since the ring 31 of gear teeth has 15 teeth, and since there are 16 teeth on the gear 33, this relation of gear teeth causes the gear 33 to rotate in a shaftwise direction with respect to the member 29 at the rate of $$\frac{6,000}{16}=375 \text{ r.p.m.}$$

Since the rotation caused by the intermeshing of the gear 33 and the member 29 is greater than the rotation caused by the intermeshing of the gear 21 and the member 29, the resultant speed at which the gear 33 is driven under these conditions is 375 r.p.m.—300 r.p.m.=75 r.p.m. in the shaftwise direction. Thus, when the motor shaft 13 is operated at 6,000 r.p.m., the gear 33 is rotated at 75 r.p.m. in the same direction as the shaft is rotated.

Assuming that the electric motor is rotated at a slower speed so as to drive the shaft 13 at 1500 r.p.m., the member 29 meshing with the gear 21 is then driven at a speed of $$\frac{1500}{20}=75 \text{ r.p.m.}$$

in the countershaftwise direction, and the meshing of the gear 33 with the member 29 causes the gear 33 to be driven at a speed of $$\frac{1500}{16}=94 \text{ r.p.m.}$$

in the shaftwise direction. Thus, when the motor shaft 13 is rotated at 1,500 r.p.m., the resulting speed of rotation of the gear 33 is 94 r.p.m.—75 r.p.m.=19 r.p.m. in the shaftwise direction. Accordingly, by changing the speed of rotation of the electric motor from 6,000 r.p.m. to 1500 r.p.m., the speed of rotation of the gear 33 is reduced from 75 r.p.m. to 19 r.p.m. These speed ratios are particularly suitable for driving windshield wipers of the like wherein it is desired to oscillate the windshield wipers at a rate of from about 85 oscillations per minute to 19 oscillations per minute.

Slidably mounted adjacent the eccentric 36 on the gear 33 is a slider 38 which is slidably mounted in guides 39 formed in the cover plate 17. The slider 38, which is preferably formed from nylon or powdered iron or the like, is provided with two ears 40 which extend to each side of the eccentric 36 so that as the eccentric 36 is rotated about the shaft 13, the ears 40 operate to slide the slider 38 back and forth. The slider 38 is provided with a central opening 41, along one edge of which is arranged a toothed rack 42. One end of the slider 38 is also provided with an ear 43.

A pinion 45 provided with a hub 46 is rotatably mounted on the end of the motor shaft 13 and it is provided with teeth 47 meshing with the toothed rack 42 on the slider. The pinion is shown as a multilated gear and it is preferably formed from powdered iron or the like, and is preferably impregnated with a suitable lubricant. The hub 46 of the pinion is journalled for rotation in a bearing member 48, preferably formed of porous bronze or the like, which is in turn secured within a boss 49 on the cover plate 17. The space between the boss 49 and the bearing member 48 is provided with a suitable oil wick 50 for applying lubrication to the running surfaces. The end of the shaft 13 carries a ball 51 which is engaged by a plug 52 screwthreaded into the end of the hub 46 of the pinion 45. This plug co-operates with the motor shaft 13 for the purpose of taking up end play in the drive mechanism. Also, the outer end of the hub 46 of the pinion 45 is provided with a plurality of notches 53, to facilitate securing an arm thereto, which arm is utilized for the purpose of driving the windshield wipers and the like. Thus, as the gear 33 is rotated at speeds ranging from 85 r.p.m. to 19 r.p.m., the pinion 46 is oscillated at a frequency ranging from 85 oscillations per minute to 19 oscillations per minute. The relationship between the pinion 45 and the slider 38 is such as to oscillate the pinion through an angular range of substantially 120°.

Arranged concentrically about the differential gear speed reducer, is a C-shaped member 55 formed of suitable electrical insulating material such as Bakelite or the like. This member is provided with an annular recess 56. At one end it is also provided with a pair of concentrically arranged slots 57 and 59, the slot 57 inwardly terminating in a slot 58 arranged parallel to the axis of the shaft 13. Intermediate its ends, the slot 59 communicates with a slot 60 also parallel to the axis of rotation of the shaft 13. Toward the other end of the C-shaped member 55 is a third slot 61, which also is arranged parallel to the axis of the shaft 13. A second C-shaped member 63, also formed of electrical insulating material such as Bakelite or the like, is arranged adjacent the member 55 and it is provided near one end with a recess 64 and near its other end with a recess 65, the recesses 64 and 65 communicating with the slots 58 and 61 in the member 55. The member 63 is also provided adjacent one end with slots 66 and 67 which communicate with the slots 57 and 59 in the member 55. The two members 55 and 63 are secured together and to the cover 17 by means of a plurality of rivets 68.

Located within the annular recess 56 in the member 55 is a ring 70 formed of electrical insulating material such as nylon or the like, the ring being channel-shaped in cross section. Located in the channel is a curved conductor bar or wire 71 which extends through less than one-half the circumference of the channel member 70. Secured to one end of this conductor bar 71, as by soldering, welding, or the like, is a helical resistance wire 72. This resistance wire is arranged within the channel member 70. The conductor bar 71 and resistance wire 72 are suitably secured within the channel 70, as by pressed fit, heat sealing, or the like. Adjacent the upper portion, as illustrated in Figs. 3, 6 and 7, the channel member 70 is provided with a toothed flange 73 which extends parallel to the axis of the shaft 13, and adjacent the bottom of the channel member, it may be also provided with a similar plain flange 74 for guiding purposes.

A terminal 76 extends through the slot 58 in the member 55 and this terminal 76 is integrally formed on a spring contact blade 77, which is arranged in the slots 57 and 66 in the members 55 and 63. A brush 78, which may be a carbon brush or the like, is arranged in the recess 64 in the member 63 and it is pressed by a spring 79 against the conductor bar 71 carried by the channel member 70. Thus, the electrical connector 76 is electrically connected to the spring contact finger 77 and to the conductor bar 71 by the brush 78. A second electrical terminal 81 extends through the slot 61 in the member 55 and it is electrically connected through a similar spring 79 to a carbon brush 82 arranged in the recess 65 in the member 63. This brush 82 contacts the helical resistance wire 72. In one position of the channel member 70 the brush 82 contacts this resistance wire 72 where the latter is secured to the conductor bar 71, and in other positions of the channel member 70 the brush 82 contacts the helical resistance wire 72 at points along its length.

A second spring contact member 85 is carried in the slots 59 and 67 of the members 55 and 63 and it is provided with an electrical terminal 86 which extends through the slot 60 in the member 55.

An adjusting pinion 88 arranged within a recess 89 in the member 63 meshes with the toothed flange 73 on the channel member 70, the pinion 88 being carried by a shaft 90 rotatably mounted in a boss 91 on the cover 17. Thus, as the shaft 90 is rotated, the pinion 88 drives, through the toothed flange 73, the channel member 70 in a rotating manner. Thus, the channel member 70 may be rotatably positioned to adjust the positions of the conductor bar 71 and helical resistance wire 72 with respect to the brushes 78 and 82.

The channel member 70 is provided with a radially extending cam 93 which is adapted to engage and disengage a follower 94 on the contact spring 77. The contact spring 77 carries a contact 95 which is adapted to engage a contact 96 on the contact spring 85. The contact spring 85 is provided with an offset tongue 97 which under certain circumstances is adapted to be engaged by the ear 43 on the slider 38. The contacts 95 and 96 on the contact springs 77 and 85 operate to start and stop the electric motor and these contact springs 77 and 85 are operated by two devices (1) the cam 93 on the channel-shaped ring 70 and (2) the ear 43 on the slider 38. The contact springs 77 and 85 are so arranged that the contacts 95 and 96 are normally closed, and this is true regardless of whether the cam 93 is out of engagement with the follower 94 as illustrated in Fig. 10, or is in engagement therewith, as illustrated in Fig. 9. When the cam 93 engages the follower 94, as illustrated in Fig. 9, the contacts 95 and 96 are closed and the offset tongue 97 is shifted out of the path of movement of the ear 43 on the slider 38, so that the slider is ineffective to separate the contacts 95 and 96. However, when the cam 93 is moved out from under the follower 94, as illustrated in Fig. 10, the contacts 95 and 96 remain closed, but the offset tongue 97 is moved into the path of movement of the ear 43 on the slider 38. When the slider 38 reaches the end of its movement, as shown in Fig. 6, the ear 43 engages the tongue 97 to separate the contacts 95 and 96. Thus, Fig. 6 illustrates the parts in a position wherein the control means is in the off position and the motor is de-energized with the slider 38 in an end position. To start the motor, the pinion 88 is rotated to move the cam 93 on the channel member 70 underneath the follower 94, as illustrated in Fig. 9, and this operates to close the contacts 95 and 96 to energize the motor. The motor will operate continuously until the cam 93 is moved out from under the follower 94. By further rotating the channel member 70, more and more resistance is connected in series with the field of the motor, which operates to increase the speed of the motor. When the motor is first started and no resistance is in series with the field, the motor operates at slow speed, as, for example, 1500 r.p.m. However, as the channel member 70 is rotated further in the on direction, the resistance in series with the field is increased and when maximum resistance is placed in series, the motor operates at its highest speed of 6,000 r.p.m. To de-energize the motor, the cam 93 is moved out from under the follower 94 and the motor continues to operate until such time as the ear 43 on the slider 38 separates the contacts 95 and 96 to stop the motor in an end position of the slider 38.

Fig. 12 illustrates the wiring connections for the motor, like reference characters for like parts being utilized. When the contacts 95 and 96 are opened, the motor is de-energized. When the contacts 95 and 96 are closed the motor is energized and the speed of the motor depends upon the resistance in series with the field winding 15 thereof.

As noted above, all of the parts of the driving mechanism are arranged concentrically about the axis of the motor shaft 13 and all of the parts are enclosed within a substantially cylindrical housing 11. To shift the range of oscillation of the pinion 47 and the wipers driven thereby, all that is necessary is to adjustably position the entire drive mechanism about the motor shaft axis. This is effectively accomplished by the same means which mounts the driving mechanism. Toward this end, the end plate 17 is provided with a pair of projections 100, which extend through slots 101 in a strap-type mounting bracket 102. The mounting bracket is provided with a pair of mounting ears 103 which have holes therein for mounting the some to any desired support. Thus, it is seen that the drive mechanism and its housing 11 may be rotatably positioned with respect to the mounting bracket 102, the extent of rotatable adjustment being determined by the extent of the slots 101. When the drive mechanism is arranged in its proper adjusted position, it is clamped in that position by tightening the screw and nut 105, 106, extending through ears 104 on the ends of the strap-type bracket 102.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. A driving mechanism for windshield wipers and the like comprising, an electric motor, a shaft rotated by the motor, an eccentric secured to the shaft for rotation therewith, a member rotatably mounted on the eccentric and oscillated thereby and having a pair of rings of gear teeth arranged thereon, a first toothed gear concentric with the shaft and secured against rotation and meshing with one ring of gear teeth on the member to react against the member, a second toothed gear rotatably mounted concentrically with the shaft and meshing with the other ring of gear teeth on the member for rotation by the member, a second eccentric carried by the second toothed gear, a slider reciprocated by the second eccentric and having a rack thereon, a pinion rotatably mounted concentrically with the shaft and meshing with the rack and oscillated thereby through a fixed angle of oscillation and forming oscillating driving means for the windshield wipers and the like.

2. A driving mechanism for windshield wipers and the like comprising, an electric motor, a shaft rotated by the motor, an eccentric secured to the shaft for rotation therewith, a member rotatably mounted on the eccentric and oscillated thereby and having a pair of rings of gear teeth arranged thereon, a first toothed gear concentric with the shaft and secured against rotation and meshing with one ring of gear teeth on the member to react against the member, a second toothed gear rotatably mounted concentrically with the shaft and meshing with the other ring of gear teeth on the member for rotation by the member, a second eccentric carried by the second toothed gear, a slider reciprocated by the second eccentric and having a rack thereon, a pinion rotatably mounted concentrically with the shaft and meshing with the rack and oscillated thereby through a fixed angle of oscillation and forming oscillating driving means for the windshield wipers and the like, a substantially cylindrical housing for the driving mechanism and concentrically arranged with respect to the shaft thereof, and a mounting bracket rotatably adjustably receiving and supporting the housing and providing for adjustment of the fixed angle of oscillation of the oscillating driving means with respect to the mounting bracket.

3. A driving mechanism for windshield wipers and the like comprising, an electric motor, a shaft rotated by the motor, an eccentric secured to the shaft for rotation therewith, a member rotatably mounted on the eccentric and oscillated thereby and having a pair of rings of gear teeth arranged thereon, a first toothed gear concentric with the shaft and secured against rotation and meshing with one ring of gear teeth on the member to react against the member, a second toothed gear rotatably mounted concentrically with the shaft and meshing with the other ring of gear teeth on the member for rotation by the member, motion transmitting means concentric with the shaft and connected to the second toothed gear and including means for translating rotary motion of the second toothed gear to oscillating motion through a fixed angle of oscillation and forming oscillating driving means for the windshield wipers and the like, a substantially cylindrical housing for the driving mechanism and concentrically arranged with respect to the shaft thereof, and a mounting bracket rotatably adjustably receiving and supporting the housing and providing for adjustment of the fixed angle of oscillation of the oscillating driving means with respect to the mounting bracket.

4. A driving mechanism for windshield wipers and the like comprising, an electric motor, a shaft rotated by the motor, differential gear speed reducer means concentric with the shaft and including an output member rotated at reduced speed thereby, motion transmitting means concentric with the shaft and connected to the output member of the speed reducer means and including means for translating rotary motion of the speed reducer means to oscillatory motion through a fixed angle of oscillation and forming oscillating driving means for the windshield wipers and the like, a substantially cylindrical housing for the driving mechanism and concentrically arranged with respect to the shaft thereof, and a mounting bracket rotatably adjustably receiving and supporting the housing and providing for adjustment of the fixed angle of oscillation of the oscillating driving means with respect to the mounting bracket.

5. A driving mechanism for windshield wipers and the like comprising, an electric motor, a shaft rotated by the motor, differential gear speed reducer means concentric with the shaft and including an output member rotated at reduced speed thereby, an eccentric having its axis of rotation concentric with the shaft and rotated by the output member of the differential gear speed reducer means, a slider reciprocated by the eccentric and having a rack thereon, a pinion rotatably mounted concentrically with the shaft and meshing with the rack and oscillated thereby through a fixed angle of oscillation and forming oscillating driving means for the windshield wipers and the like.

6. A driving mechanism for windshield wipers and the like comprising, an electric motor, a shaft rotated by the motor, differential gear speed reducer means concentric with the shaft and including an output member rotated at reduced speed thereby, an eccentric having its axis of rotation concentric with the shaft and rotated by the output member of the differential gear speed reducer means, a slider reciprocated by the eccentric and having a rack thereon, a pinion rotatably mounted concentrically with the shaft and meshing with the rack and oscillated thereby through a fixed angle of oscillation and forming oscillating driving means for the windshield wipers and the like, a substantially cylindrical housing for the driving mechanism and concentrically arranged with respect to the shaft thereof, and a mounting bracket rotatably adjustably receiving and supporting the housing and providing for adjustment of the fixed angle of oscillation of the oscillating driving means with respect to the mounting bracket.

7. A driving mechanism for windshield wipers and the like comprising, an electric motor, a shaft rotated by the motor, differential gear speed reducer means concentric with the shaft and including an output member rotated at reduced speed thereby, an eccentric having its axis of rotation concentric with the shaft and rotated by the output member of the differential gear speed reducer means, a slider reciprocated by the eccentric and having a rack thereon, a pinion rotatably mounted concentrically with the shaft and meshing with the rack and oscillated thereby through a fixed angle of oscillation and forming oscillating driving means for the windshield wipers and the like, electrical means for starting and stopping the electric motor and including normally-closed switch means for maintaining the electric motor in operation, and means on the slider engaging the switch means for opening the same when the slider reaches an end position for continuing motor operation until the oscillating driving means is oscillated to one end of the fixed angle of oscillation and then stopping the motor.

8. A driving mechanism for windshield wipers and the like comprising, an electric motor, a shaft rotated by the motor, differential gear speed reducer means concentric with the shaft and including an output member rotated at reduced speed thereby, an eccentric having its axis of rotation concentric with the shaft and rotated by the output member of the differential gear speed reducer means, a slider reciprocated by the eccentric and having a rack thereon, a pinion rotatably mounted concentrically with the shaft and meshing with the rack and oscillated thereby through a fixed angle of oscillation and forming oscillating driving means for the windshield wipers and the like, electrical means for starting and stopping the electric motor and including normally-closed switch means for maintaining the electric motor in operation, and means on the slider engaging the switch means for opening the same when the slider reaches an end position for continuing motor operation until the oscillating driving means is oscillated to one end of the fixed angle of oscillation and then stopping the motor, and manually operated means for shifting the switch means out of the path of movement of the slider for continuously maintaining the switch means closed to maintain the motor in continuous operation.

9. A driving mechanism for windshield wipers and the like comprising, an electric motor, a shaft rotated by the motor, differential gear speed reducer means concentric with the shaft and including an output member rotated at reduced speed thereby, an eccentric having its axis of rotation concentric with the shaft and rotated by the output member of the differential gear speed reducer means, a slider reciprocated by the eccentric and having a rack thereon, a pinion rotatably mounted concentrically with the shaft and meshing with the rack and oscillated thereby through a fixed angle of oscillation and forming oscillating driving means for the windshield wipers and the like, electrical means for starting and stopping the electric motor and including normally-closed switch means for maintaining the electric motor in operation, and means on the slider engaging the switch means for opening the same when the slider reaches an end position for continuing motor operation until the oscillating driving means is oscillated to one end of the fixed angle of oscillation and then stopping the motor, and manually operated means for shifting the switch means out of the path of movement of the slider for continuously maintaining the switch means closed to maintain the motor in continuous operation, and a variable resistance means controlled by the manually operated means for controlling the speed of operation of the motor as it is being continuously operated.

References Cited in the file of this patent

UNITED STATES PATENTS

| | | |
|---|---|---|
| 178,071 | Martin | May 30, 1876 |
| 1,004,918 | Shaw | Oct. 3, 1911 |
| 1,135,990 | Bronander | Apr. 20, 1915 |
| 1,563,945 | Apple | Dec. 1, 1925 |
| 2,256,055 | Probst | Sept. 16, 1941 |
| 2,484,781 | Coffey | Oct. 11, 1949 |
| 2,513,247 | Morton | June 27, 1950 |
| 2,832,225 | Hart | Apr. 29, 1958 |

FOREIGN PATENTS

| | | |
|---|---|---|
| 516,277 | Great Britain | Dec. 28, 1939 |